3,563,983
3-(BENZENE-FUSED HETEROCYCLIC THIOL) SUBSTITUTED SYNDNONECEPHALOSPORIN COMPOUNDS AND PROCESS FOR PREPARATION THEREOF
Sueo Atarashi, Kyoto, Susumu Horibe, Osaka, Masashi Mera, Amagasaki, and Ritsuko Nakagawa, Akashi, Japan, assignors to Fujisawa Pharmaceutical Co., Ltd., Osaka, Japan
No Drawing. Filed Oct. 31, 1967, Ser. No. 679,519
Int. Cl. C07d 99/24
U.S. Cl. 260—243     6 Claims

ABSTRACT OF THE DISCLOSURE

The compounds of this invention are 3-(benzene-fused heterocyclic thiol) substituted 7-sydnonecephalosporin compounds. These compounds manifest significant activity against a wide variety of microorganisms including both gram-positive and gram-negative bacteria, and also are excreted in bile at a higher concentration.

---

This invention relates to certain 3-(benzene-fused heterocyclic thiol) substituted sydnonecephalosporin compounds and processes for the preparation thereof.

The compounds of this invention are useful antibacterial agents that are active against various strains of gram-positive and gram-negative organisms. A still more advantage is that these compounds are excreted in bile at a higher concentration.

It is an object of this invention to provide novel 3-(benzene-fused heterocyclic thiol) substituted sydnonecephalosporin compounds.

It is another object of this invention to provide processes for the preparation of the said compounds. Other objects and advantageous features will become apparent in the light of the disclosure as described hereinbelow.

The compounds of this invention can be illustrated by the following structural formula:

$$Z-CONH-CH-CH \begin{matrix} S \\ \\ \end{matrix} CH_2 \quad \begin{matrix} Y \\ \\ \end{matrix} \begin{matrix} X' \\ \\ X'' \end{matrix}$$
$$\quad \quad \quad \, | \quad \quad \, | \quad \quad \,$$
$$\quad \quad \quad CO-N \quad C-CH_2-S$$
$$\quad \quad \quad \quad \quad \, \| \quad$$
$$\quad \quad \quad \quad \quad \, C$$
$$\quad \quad \quad \quad \quad \, |$$
$$\quad \quad \quad \quad \, COOM$$

in which Z is the group, $$\begin{matrix} N-N-A- \\ O \diagdown \pm \, | \\ \diagdown C-C-R' \\ \diagup\!\!\!/ \\ O \end{matrix} \quad \text{or} \quad \begin{matrix} N-N-R'' \\ O \diagdown \pm \, | \\ \diagdown C-C-(A)_n- \\ \diagup\!\!\!/ \\ O \end{matrix}$$

wherein R' is hydrogen, halogen, alkyl, substituted alkyl, aryl, substituted aryl, aralkyl or substituted aralkyl, R'' is alkyl, substituted alkyl, aryl, substituted aryl, aralkyl or substituted aralkyl, A is alkylene, substituted alkylene, arylene-alkylene or substituted arylene-alkylene, and $n$ is zero or one; X' and X'' are the same or dissimilar hydrogen, halogen, nitro, amino, alkyl or alkoxy; Y is imino, alkylimino, oxygen, sulfur or vinylene; and M is hydrogen or a pharmaceutically acceptable cation.

The halogen atom can include chlorine, bromine, fluorine, and the like.

The unsubstituted or substituted alkyl per se and included in alkylimino radical can be the monovalent aliphatic hydrocarbon having from one to four carbon atoms and a straight or branched chain, or containing such a substituent as a hydroxy or halogen substituent, and specifically, methyl, ethyl, propyl, isopropyl, butyl, isobutyl, t-butyl, hydroxymethyl, hydroxyethyl, chloromethyl, chloroethyl, and the like.

The unsubstituted or substituted aryl radical can include the aromatic hydrocarbon either unsubstituted or substituted by a hydroxy, halogen, nitro, alkyl or alkoxy substituent, and specifically, phenyl, naphthyl, hydroxyphenyl, hydroxynaphthyl, chlorophenyl, chloronaphthyl, nitrophenyl, nitronaphthyl, tolyl, methoxyphenyl, and the like.

The unsubstituted or substituted aralkyl radical can include the monovalent aryl-substituted aliphatic hydrocarbon having a straight or branched chain and from one to four carbon atoms, wherein a hydroxy, halogen, nitro, alkyl or alkoxy substituent can be attached to the carbon atom of the aryl ring, and specifically, benzyl, hydroxybenzyl, chlorobenzyl, nitrobenzyl, methylbenzyl, methoxybenzyl, phenethyl, chlorophenethyl, hydroxyphenethyl, nitrophenethyl, methylphenethyl, methoxyphenethyl, and the like.

The unsubstituted or substituted alkylene radical can include the divalent aliphatic hydrocarbon having from one to four carbon atoms and a straight or branched chain, or containing such aryl or aralkyl substituent, and specifically, methylene, ethylene, propylene, butylene, methylmethylene, methylethylene, phenylmethylene, phenylethylene, benzylethylene, and the like.

The unsubstituted or substituted arylene-alkylene radical can include phenylene-methylene, phenylene-ethylene, chlorophenylene-methylene, and the like.

One of the starting materials, the amphoteric 7-aminocephalosporanic acid, can be prepared by hydrolyzing the antibiotic cephalosporin C according to the well known methods.

In the preparation of the compounds used in this invention, the above amphoteric acids can be used in a free acid or in a form of a salt of an alkali metal such as sodium or potassium.

One of other starting materials, sydnone acids, can be prepared from the N-nitroso derivatives of N-substituted α-amino acids according to the methods described in Chemical Review, vol. 84, pp. 129–147 (1964). The large number of the sydnone acids to be used in the preparation of the compounds of this invention can be divided roughly into two groups: sydnone-3-acids having the formula:

$$\begin{matrix} N-N-A-COOH \\ O \diagdown \pm \, | \\ \diagdown C-C-R' \\ \diagup\!\!\!/ \\ O \end{matrix}$$

and sydnone-4-acids having the formula:

$$\begin{matrix} N-N-R'' \\ O \diagdown \pm \, | \\ \diagdown C-C-(A)_n-COOH \\ \diagup\!\!\!/ \\ O \end{matrix}$$

Among the sydone-3-acids can be included sydnone-3-acetic acids, sydnone-3-propionic acid, sydnone-3-butyric acid, sydnone-3-(α - methyl)acetic acid, sydnone-3-(α-phenyl)-acetic acid, sydnone-3-(α - benzyl) acetic acid, sydnone-3-(α-methyl) propionic acid, sydnone-3-(α-phenyl) propionic acid, sydnone-3-(α-benzyl) propionic acid, sydnone-3-(α-methyl) butyric acid, p-(3-sydnonyl) phenylacetic acid and the like. These syndone acids can carry on the 4-position of the sydnone ring one substituent of a number of types as represented by R', preferably hydrogen, chlorine, bromine, methyl, ethyl, propyl, isopropyl, butyl, isobutyl, t - butyl, hydroxymethyl, hydroxyethyl, chloromethyl, chloroethyl, phenyl, naphthyl, hydroxyphenyl, hydroxynaphthyl, chlorophenyl, chloronaphthyl, nitrophenyl, nitronaphthyl, tolyl, methoxyphenyl, benzyl, phenethyl, chlorobenzyl, hydroxybenzyl, methoxybenzyl, chlorophenethyl, hydroxyphenethyl, methylphenethyl and the like. Similarly, the sydnone-4-acids can include sydnone-4-carboxylic acid, sydnone - 4-acetic acid, sydnone-4-propionic acid, sydnone-4-butyric acid, sydnone-4-(α-methyl) acetic acid, sydnone-4-(α-phenyl)-acetic acid, sydnone-4-(α-benzyl) acetic acid, sydnone-4-(α-methyl) propionic acid, sydnone-4-(α-phenyl) propionic acid, sydnone - 4 - (α-benzyl) propionic acid, sydnone-4-(α-methyl) butyric acid, p-(4-sydnonyl)phenylacetic acid and the like, each containing on the 3-position of the sydnone ring the same substituent as, other than the hydrogen and halogen substituents, enumerated above under the substituent on the 4-position of the sydnone-3-acids. The reactive derivatives of these sydnone acids also can be used in the form of the acid halides, acid amides, acid esters or acid anhydrides.

The benzene-fused heterocyclic thiols to be used as starting materials can be divided roughly into four groups; benzimidazolethiols, benzoxazolethiols, benzothiazolethiols and quinolinethiols. These thiols are illustrated specifically by the following:

(a) benzimidazolethiols:
  2-benzimidazolethiol,
  5-amino-2-benzimidazolethiol,
  6-amino-2-benzimidazolethiol,
  5-chloro-2-benzimidazolethiol,
  6-chloro-2-benzimidazolethiol,
  5,6-dichloro-2-benzimidazolethiol,
  5-fluoro-2-benzimidazolethiol,
  6-fluoro-2-benzimidazolethiol,
  5-methyl-2-benzimidazolethiol,
  5-methyl-6-nitro-2-benzimidazolethiol,
  5-nitro-2-benzimidazolethiol,
  1-methyl-2-benzimidazolethiol, and the like,
(b) benzoxazolethiols:
  2-benzoxazolethiol,
  5-amino-2-benzoxazolethiol,
  5-t-butyl-2-benzoxazolethiol,
  5-chloro-2-benzoxazolethiol,
  5,7-dichloro-2-benzoxazolethiol,
  5,7-dimethyl-2-benzoxazolethiol,
  4,7-dimethyl-2-benzoxazolethiol,
  5-methoxy-2-benzoxazolethiol,
  5-methyl-2-benzoxazolethiol,
  5-nitro-2-benzoxazolethio, and the like,
(c) benzothiazolethiols:
  2-mercaptobenzothiazole,
  2-mercapto-6-nitrobenzothiazole,
  2-mercapto-4-methylbenzothiazole
  2-mercapto-6-methylbenzothiazole, and the like,
(d) quinolinethiols:
  2-quinolinethiols, and the like.

In the preparation of the compounds of this invention, a few routes are possible, as described below. The first step is the acylation of 7-aminocephalosporanic acid or salts thereof with the sydone acids or reactive derivatives thereof to form the sydone-acylated cephalosporanic acids. Following the acylation reaction, the sydone-acylated acids are modified by reaction with the benzene-fused heterocyclic thiols which replace the acetoxyl group on the exocyclic methylene. Alternatively, the reverse reaction may be used. To be more precise, the first is the nucleophilic displacement and then the acylation of the 3-substituted cephalosporins is achieved by forming the 3-(benzene-fused heterocyclic thiol) substituted 7-sydnonecephalosporin compounds.

In addition to the reaction of 7-aminocephalosporanic acid or salts thereof with the benzene-fused heterocyclic thiols, the 3-substituted cephalosporins which are useful in the preparation of the 3-(benzene-fused heterocyclic thiol) substituted sydnonecephalosporin compounds in accordance with this invention can be prepared by hydrolyzing the 3-substituted cephalosporin C which can be modified by reaction with both the above antibiotic, cephalosporin C, and the benzene-fused heterocyclic thiols.

In those cases, 7-aminocephalosporanic acid or the 3-substituted cephalosporins or salts thereof is/are acylated with the sydnone acids or reactive derivatives thereof in a solvent such as acetone, dioxane, chloroform, ethylene chloride, tetrahydrofuran, dimethylformamide, dimethylsulfoxide, and any other inert organic solvent. Although the acylation reaction is accomplished in the presence of a base and a condensing agent, it is desired to conduct the reaction by using reactive derivatives of sydnone acids in the absence of the condensing agent. A variety of the bases such as sodium bicarbonate, triethylamine, triethanolamine and the like can be used, triethylamine being preferred. As the condensing agents, there can be included N,N'-diethylcarbodiimide, N,N'-di-n-propylcarbodiimide, N,N'-diisopropylcarbodiimide, N,N'-di-n-butylcarbodiimide, N,N'-diisobutylcarbodiimide, N-propyl-N'-allylcarbodiimide, N,N' - dicyclohexylcarbodiimide, N-ethyl-N'-(4-ethylmorpholino)carbodiimide, N-cyclohexyl-N' - morpholinoethylcarbodiimide, N,N' - carbonyldi-(2-methylimidazole), pentamethyleneketene - N-cyclohexylimine, diphenylketene - N - cyclohexylimine, 1-ethoxy-1-chloroethylene, tetraethyl phosphite, ethyl polyphosphate, isopropyl polyphosphate, phosphorus oxychloride, phosphorus trichloride, oxalyl chloride, thionyl chloride, N-ethyl-5-phenylisoxazolium-3'-sulfonate and the like. A preferred one is N,N'-dicyclohexylcarbodiimide.

Furthermore, it is preferred to carry out the acylation at about room temperature although lower temperature can be employed when the particular reactants are unduly susceptible to decomposition.

On the other hand, the nucleophilic displacement of the acetoxyl group of the cephalosporins occurs readily with the benzene-fused heterocyclic thiols in a number of solvents, preferably polar solvents like water, aqueous acetone, chloroform, aqueous methanol, ethanol, dimethylformamide, dimethylsulfoxide, and the like. The nucleophilic reaction can also be carried out in a buffer such as a phosphate or borate buffer. If the free acids of the sydnone acylated cephalosporins and 7-aminocephalosporanic acid are used, the reaction is carried out in the presence of the bases such as sodium bicarbonate, triethylamine, and the like. It is preferred to conduct the nucleophilic reaction at a temperature within the range of about 30–70° C.

In the preferred embodiment of the preparation of the sydnone-acylated cephalosporins in accordance with this invention, 7-aminocephalosporanic acid which is dissolved in an appropriate solvent like chloroform by adding a base like triethylamine is reacted with the sydnone acids or reactive derivatives thereof dissolved in tetrahydrofuran in the presence or absence of a condensing agent like dicyclohexylcarbodiimide. The reaction mixture is stirred at about room temperature or under cooling. After the reaction is terminated, the desired material is separated by conventional means, such as by concentration of the reaction mixture and extraction with the base like sodium bicarbonate or ethyl acetate.

In the preferred embodiment of the preparation of the 3-substituted cephalosporins in accordance with this invention 7-aminocephalosporanic acid or its salts and the benzene-fused heterocyclic thiols are reacted in aqueous acetone in the presence of the base at the temperature within the range of about 30–70° C. The desired compounds can be separated by conventional methods.

The sydnone-acylated cephalosporins and 3-substituted cephalosporins which can be prepared by the procedures disclosed hereinabove are used as starting materials in the preparation of the 7-(benzene-fused heterocyclic thiol) substituted sydnonecephalosporins compounds.

The pharmaceutically acceptable salts of the compounds of this invention can be formed with an alkali metal hydroxide, an alkali metal carbonate, an alkali metal acetate, an alkali metal salicylate, or organic base such as dicyclohexylamine, N,N-dibenzylethylenediamine, procaine, and the like.

The following examples are illustrative of the compounds of the invention.

EXAMPLE 1

A solution of 1.8 g. of 2-benzimidazolethiol in 30 ml. of acetone was added to a solution of 4.38 g. of sodium 7-(sydnone-3-acetamido)cephalosporanate in 30 ml. of a borate buffer at pH 6.4. The mixture was stirred at 60° C. for 7.5 hours, cooled and diluted with 50 ml. of water. Removal of acetone under reduced pressure produced crystals, which was then treated with three 20 ml. portions of acetone to obtain 1.75 g. of 7-(sydnone-3-acetamido) - 3 - (2 - benzimidazolylthiomethyl)-3-cephem-4-carboxylic acid, melting at 174–176° C. with decomposition. This compound exhibits an ultraviolet absorption maximum, in a phosphate buffer at pH 6.4, at 291.5 millimicrons with E percent of about 473, and infrared absorption maxima at about 5.59, 5.73, 5.85, 6.12, 6.29 and 13.33 microns. It requires 2.0 and 0.5 mg./ml. to prevent growth of *Escherichia coli* and *Staphylococcus aureus*, respectively.

EXAMPLE 2

A solution of 1.194 g. of 7-(sydnone-3-acetamido)-cephalosporanic acid, 980 mg. of 5-nitro-2-benzoxazolethiol and 672 mg. of sodium bicarbonate in 20 ml. of water was stirred for 5.5 hours at 60° C. The reaction mixture was treated with acetone, filtered and concentrated. The resultant liquid was washed with ether, adjusted to pH 2.0 with hydrochloric acid and extracted with ethyl acetate. The ethyl acetate solution was washed with water, dried and concentrated to leave a residue which was washed with ether, acetone and ether in turn to obtain 355 mg. of 7-(sydnone-3-acetamido)-3-(5-nitro-2 - benzoxazolylthiomethyl) - 3-cephem-4-carboxylic acid melting at 173–176° C. with decomposition. This compound exhibits an ultraviolet absorption maximum, in 0.2% aqueous sodium bicarbonate solution, at 274 millimicrons with E percent of 561. It requires 2.5 and 0.25 mg./ml. to prevent growth of *Escherichia coli* and *Staphylococcus aureus*, respectively.

EXAMPLE 3

The procedure of Example 2 was followed using 665 mg. of 5 - chloro-2-benzoxazolethiol in place of 5-nitro-2-benzoxazolethiol used therein. There was obtained 7-(sydnone - 3 - acetamido)-3-(5-chloro-2-benzoxazolylthiomethyl)-3-cephem-4-carboxylic acid, melting at 186° C. with decomposition. It displays ultraviolet absorption peaks at about 245, 290 and 296 millimicrons with E percent of about 341, 457 and 486, and exhibits an infrared absorption maximum at about 6.04 microns. It requires 2.5 and 0.25 mg./ml. to prevent growth of *Escherichia coli* and *Staphylococcus aureus*, respectively.

EXAMPLE 4

The procedure of Example 2 was followed using 1.0 g. of 2 - mercaptobenzothiazole in place of 5-nitro-2-benzoxazolethiol used therein. There was obtained 7-(sydnone-3-acetamido) - 3 - (2-benzothiazolylthiomethyl)-3-cephem-4-carboxylic acid, melting at 168–173° C. with decomposition. It exhibits ultraviolet absorption maxima, in 95% ethanol, at 224, 284, 291 and 300 millimicrons with E percent of 447, 422, 423 and 374. It requires 2.5 and 0.25 mg./ml. to prevent growth of *Escherichia coli* and *Staphylococcus aureus*, respectively.

EXAMPLE 5

The procedure of Example 2 was followed using 21.0 g. of sodium 2-benzoxazolethiolate in place of 5-nitro-2-benzoxazolethiol used therein. There was obtained 7-(sydnone - 3 - acetamido)-3-(2 - benzoxazolylthiomethyl)-3-cephem-4-carboxylic acid, melting at 150–155° C. with decomposition. It exhibits ultraviolet absorption maxima, in 95% ethanol, at about 251 and 287 millimicrons with E percent of 332 and 520, and requires 5.0 and 0.5 mg./ml. to prevent growth of *Escherichia coli* and *Staphylococcus aureus*, respectively.

EXAMPLE 6

The procedures of Examples 1 and 2 are followed using the desired benzene-fused heterocyclic thiol in place of 5-nitro-2-benzoxazolethiol and 2 - benzimidazolethiol used therein. There is obtained the corresponding 7-(benzene-fused heterocyclic thiole) substituted sydnonecephalosporin compound as follows:

7-(sydnone-3-acetamido)-3-(6-amino-2-benzimidazolylthiomethyl)-3-cephem-4-carboxylic acid
7-(sydnone-3-acetamido)-3-(5-fluoro-2-benzimidazolylthiomethyl)-3-cephem-4-carboxylic acid
7-(sydnone-3-acetamido)-3-(5-methyl-6-nitro-2-benzimidazolylthiomethyl)-3-cephem-4-carboxylic acid
7-(sydnone-3-acetamido)-3-(5,7-dichloro-2-benzoxazolylthiomethyl)-3-cephem-4-carboxylic acid
7-(sydnone-3-acetamido)-3-(5-methoxy-2-benzoxazolylthiomethyl)-3-cephem-4-carboxylic acid
7-(sydnone-3-acetamido)-3-(5-t-butyl-2-benzoxazolylthiomethyl)-3-cephem-4-carboxylic acid
7-(sydnone-3-acetamido)-3-(6-methyl-2-benzothiazolylthiomethyl)-3-cephem-4-carboxylic acid
7-(sydnone-3-acetamido)-3-(2-quinolylthiomethyl)-3-cephem-4-carboxylic acid
7-(3-isopropylsydnone-4-carbonamido)-3-(2-benzimidazolylthiomethyl)-3-cephem-4-carboxylic acid
7-(3-phenylsydnone-4-carbonamido)-3-(5-nitro-2-benzimidazolylthiomethyl)-3-cephem-4-carboxylic acid
7-(3-benzylsydnone-4-carbonamido)-3-(2-benzothiazolylthiomethyl)-3-cephem-4-carboxylic acid
7-(3-m-chlorophenylsydnone-4-carbonamido)-3-(2-benzoxazolylthiomethyl)-3-cephem-4-carboxylic acid
7-(sydnone-3-propionamido)-3-(5-amino-2-benzimidazolylthiomethyl)-3-cephem-4-carboxylic acid
7-(4-methylsydnone-3-acetamido)-3-(5-chloro-2-benzimidazolylthiomethyl)-3-cephem-4-carboxylic acid
7-(4-methylsydnone-4-acetamido)-3-(5-amino-2-benzoxazolylthiomethyl)-3-cephem-4-carboxylic acid
7-(4-methylsydnone-4-acetamido)-3-(6-nitro-2-benzothiazolylthiomethyl)-3-cephem-4-carboxylic acid
7-(3-m-chlorobenzylsydnone-4-acetamido)-3-(6-chloro-2-benzimidazolylthiomethyl)-3-cephem-4-carboxylic acid
7-(4-phenylsydnone-3-acetamido)-3-(5-methyl-2-benzimidazolylthiomethyl)-3-cephem-4-carboxylic acid
7-(3-isobutylsydnone-4-acetamido)-3-(5,6-dichloro-2-benzimidazolylthiomethyl)-3-cephem-4-carboxylic acid
7-(4-ethylsydnone-3-acetamido)-3-(2-benzothiazolylthiomethyl)-3-cephem-4-carboxylic acid
7-(3-phenethylsydnone-4-acetamido)-3-(4-methyl-2-benzothiazolylthiomethyl)-3-cephem-4-carboxylic acid
7-[3-(p-methoxybenzyl)sydnone-4-acetamido]-3-(5-nitro-2-benzoxazolylthiomethyl)-3-cephem-4-carboxylic acid
7-(4-bromosydnone-3-acetamido)-3-(5,7-dimethyl-2-benzoxazolylthiomethyl)-3-cephem-4-carboxylic acid
7-(4-chloromethylsydnone-3-acetamido)-3-(2-benzimidazolylthiomethyl)-3-cephem-4-carboxylic acid
7-[sydnone-3-(α-methyl)acetamido]-3-(5-methyl-2-benzimidazolylthiomethyl)-3-cephem-4-carboxylic acid
7-[sydnone-3-(α-phenyl)acetamido]-3-(5-methyl-2-benzoxazolylthiomethyl)-3-cephem-4-carboxylic acid
7-(4-benzylsydnone-3-acetamido)-3-(1-methyl-2-benzimidazolylthiomethyl)-3-cephem-4-carboxylic acid
7-[p-(3-sydnonyl) phenylacetamido]-3-(2-benzimidazolylthiomethyl)-3-cephem-4-carboxylic acid
7-[p-(3-sydnonyl) phenylpropionamido]-3-(5-chloro-2- benzoxazolylthiomethyl)-3-cephem-4-carboxylic acid 7-[4-(3-sydnonly)-2-chlorophenylacetamido]-3-(2-benzimidazolylthiomethyl)-3-cephem-4-carboxylic acid.

What we claim is:

1. In accordance with claim 1, 7-(sydnone-3-acetamido)-3-(2-benzimidazolylthiomethyl) - 3 - cephem - 4 - carboxylic acid or a pharmaceutically acceptable salt thereof.

2. In accordance with claim 6, 7 - (sydnone - 3 - acetamido) - 3 - (2 - benzoxazolylthiomethyl) - 3 - cephem-4-carboxylic acid or a pharmaceutically acceptable salt thereof.

3. In accordance with claim 6, 7-(sydnone - 3 - acetamido) - 3 - (5 - nitro - 2 - benzoxazolylthiomethyl)-3-cephem - 4 - carboxylic acid or a pharmaceutically acceptable salt thereof.

4. In accordance with claim 6, 7-(sydnone - 3 - acetamido) - 3 - (5-chloro - 2 - benzoxazolylthiomethyl)-3-cephem-4-carboxylic acid or a pharmaceutically acceptable salt thereof.

5. In accordance with claim 6, 7-(sydnone - 3 - acetamido) - 3 - (2-benzothiazolylthiomethyl) - 3 - cephem-4-carboxylic acid or a pharmaceutically acceptable salt thereof.

6. A compound of the formula

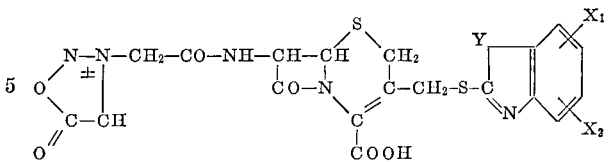

wherein $X_1$ and $X_2$ are members selected from the group consisting of hydrogen and one of said $X_1$ and $X_2$ is a member selected from the group consisting of nitro and chlorine, and Y is a member selected from the group consisting of imino, oxygen, and sulfur;

and a pharmaceutically acceptable salt of said compound.

References Cited

UNITED STATES PATENTS 3,345,368  10/1967  Lewis et al. _____ 260—243C

NICHOLAS S. RIZZO, Primary Examiner

U.S. Cl. X.R.

260—999